May 23, 1939.  A. GUERBILSKY  2,159,891

ELECTROMECHANICAL RESONATOR

Filed June 19, 1935

INVENTOR
Alexis Guerbilsky
BY
Brown & Seward
ATTORNEYS

Patented May 23, 1939

2,159,891

UNITED STATES PATENT OFFICE 2,159,891

ELECTROMECHANICAL RESONATOR

Alexis Guerbilsky, Paris, France

Application June 19, 1935, Serial No. 27,428
In France June 22, 1934

9 Claims. (Cl. 171—327)

The present invention relates to piezo-electric crystal devices adapted to resonate for a given band of frequencies and more especially crystals of the kind mentioned in French Patents Nos. 644,240, 696,817, 748,910 and 726,850.

The object of the invention is to provide a device of this kind in which undesirable vibrations are eliminated.

The essential feature of the invention consists in devising mechanical means for damping the displacements of certain points or areas of the surface of the crystals.

Preferred embodiments of the invention will be hereinafter described with reference to the accompanying drawing, given by way of example, and in which Fig. 1 shows a quartz crystal plate with non-parallel faces;

Figure 2:
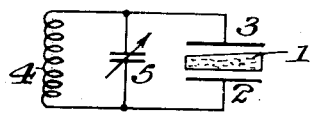
Fig. 2 shows a circuit with which the plate is connected.

In Fig. 2 the same plate 1 is disposed between the armatures 2 and 3. These armatures are connected with a coil 4 and an adjustable condenser 5.

Figure 3:
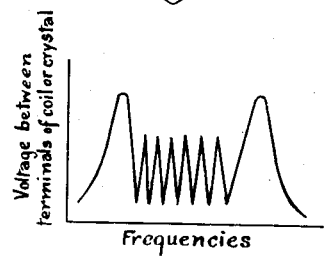
Fig. 3 represents the resonance curve of an electrical circuit including a crystal of the type of that of Fig. 1.

The corresponding resonance curve is shown in Fig. 3. In this figure and also in Figs. 5 and 7, the ordinates represent the current flowing through the circuit of Fig. 2 and the abscissas represent the frequencies of the energizing potential.

Figure 7:
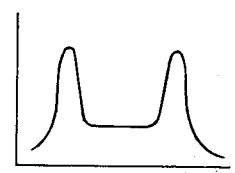
Fig. 7 represents the resonance curve of a circuit of the same type as that of Fig. 2 but making use of a plate of the kind shown in Fig. 6.

If it is desired to obtain a curve presenting a horizontal part, such as shown in Fig. 7, it is necessary to eliminate certain resonances of the plate.

Figures 1, 4, 6, 8:
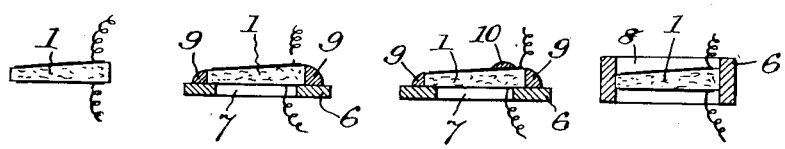
Fig. 4 shows a first embodiment of the invention.
Fig. 6 shows another embodiment of the invention.
Fig. 8 shows another embodiment of the invention.
Fig. 1 shows a quartz crystal plate 1 having non-parallel faces so as to be able to vibrate for a band of frequencies.

To begin with, I will consider the case in which I want to use vibrations of the crystal taking place in the direction of the thickness thereof, and consequently I wish to eliminate vibrations in all other directions. In this case, it suffices to arrange the plate as shown by Fig. 4. In this figure a metallic plate 6 provided with a hole 7 of the same shape as the outline of plate 1, but slightly smaller than the latter supports the crystal plate 1 which rests upon metal plate 6 in such a position that only its edges bear upon the metal, whereby the vibrations in the direction of the thickness are but very slightly damped. Plate 1 is fixed to plate 6 by a substance 9, for instance, seccotine, Canada balsam and so on. This gluing substance may be applied either all around the plate or only along some parts of its outline, so as to avoid possible reflection of elastic waves. It will be understood that longitudinal vibrations of the crystal will be damped or eliminated due to the restraint provided by substance 9.

The same result can be obtained in a different way. Fig. 8 shows another possible embodiment. In this figure, plate 6 is provided with a hole 8 of the same shape and size as plate 1. The latter is merely inserted in the hole. This hole may be either exactly of the same shape as plate 1 or be somewhat larger in some directions so that metallic plate 6 will be in contact with the crystal plate only in some determined places. In the present arrangement the longitudinal vibrations of the crystal are damped or eliminated by the restraint resulting from contact of the crystal with the sides of the hole 8, as just explained.

Figure 5:
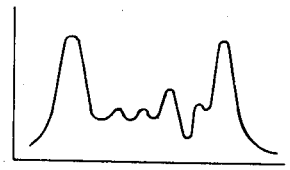
Fig. 5 shows the resonance curve of an electrical circuit of the same type as that of Fig. 2 including a plate of the kind shown in Fig. 4.

In the embodiments of Figs. 4 and 8, the resonance curve is of the type of Fig. 5 and the horizontal part is not satisfactory. To get a perfect horizontal part, as shown by Fig. 7, it is necessary to eliminate some other remaining disturbing vibrations. In the example of Fig. 6 in which a plate is disposed in a way similar to that of Fig. 4, convenient substances are applied on certain parts of the plate as shown by reference character 10, in order to avoid some localized resonances. These substances may be of the same kind as those above mentioned, for instance, in the form of a drop as shown at 10.

The plate 1 is previously metallized, e. g., silvered, and the damping substances can be applied over the silver. The metallized surfaces of the crystal constitute electrodes therefor and may be connected by suitable wires, springs, or the like in any desired circuit.

Generally speaking, in order to obtain a desired resonance curve, it is possible to proceed, for instance, in the following way. A resonator is previously devised to approximately comply with the required conditions and then the resonance curve is plotted experimentally. If this curve happens to be different from the desired one, as a result of the existence of disturbing resonances, it is necessary to find the nature of these detrimental resonances. These resonances may be either resonances of the whole of the crystal in certain directions or resonances localized to some parts of the crystal. In order to eliminate the disturbing resonances of the first kind just above mentioned, I may, for instance, arrange the crystal in the manner shown by either Fig. 4 or Fig. 8. A first approximate correction of the resonance curve is then obtained such as shown in Fig. 5 which constitutes an improvement over the curve of Fig. 3.

In order to obtain a truly correct curve, which is a curve with a horizontal part (Fig. 7), it is now necessary to eliminate the localized vibrations.

For this purpose, I exert mechanical actions on suitable parts of the crystal corresponding to the localized vibrations, these parts being determined experimentally until a curve such as that of Fig. 7 is obtained. In the example of Fig. 6, the necessary mechanical action is obtained by the application on these suitable parts of drops 10 of sticking or other suitable substances, such as plastic substances, paraffin, etc.

It also happens that certain parts of the crystal, for various reasons, are vibrating less than other parts, thus producing irregularities of the resonance curve. In such a case, the invention allows of obviating this defect.

It should be well understood that the conditions of application of the invention change with every specific case. For instance, instead of obtaining the same energy for the whole band of frequencies that is considered, it is possible deliberately to obtain any shapes of the resonance curve. In this case the different parts of the resonator will be damped in an appropriate way.

Figure 9:
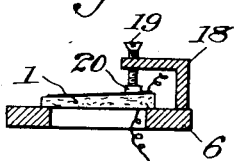
Fig. 9 shows another embodiment of the invention.

In Fig. 9, which is a modification of the embodiment of Fig. 6, plate 6 is carried by a support 18 in which is movably mounted a screw 19 adapted to exert pressure on the desired portion of crystal 1 through rubber disc 20. It will be understood that the pressure exerted by said disc 20 produces an effect similar to that of drop 10 of Fig. 6.

What I claim is:

1. The method for suppression of spurious frequencies in a crystal of non-uniform thickness which comprises damping a portion of the area of the surface of said crystal.

2. A crystal of non-uniform thickness having electrodes adjacent surfaces thereof, and at least one element or mass on said crystal and adapted to suppress spurious frequencies therein.

3. An electric circuit which comprises, in combination, a piezo-electric resonator including a crystal adapted to vibrate for a band of high frequencies the dimension of the crystal in the direction in which it resonates being non-uniform, and mechanical means on localized portions of said crystal for eliminating undesirable waves in the said band.

4. An electric circuit according to claim 3 in which said means consist of at least one element applied against said localized portions of the crystal and made of a material capable of damping the vibrations of the crystal at said portions.

5. An electric circuit according to claim 3 in which said means consist of at least one element applied against said localized portions of the crystal and made of a material adapted to prevent reflection of said waves on said portions.

6. An electric circuit according to claim 3 in which said means consist of a device for exerting a mechanical pressure on a given point of the surface of said crystal.

7. An electric circuit according to claim 3 in which said means include a support, the piezo-electric crystal consisting of a plate the edges of the under face of which rest on said support, at least a portion of said edges being glued to said support.

8. An electric circuit according to claim 3 in which said means consist of a frame surrounding said crystal and in contact therewith along at least a portion of the periphery thereof.

9. An electric circuit according to claim 3 in which said means consist of a plastic material applied against said portions of the crystal.

ALEXIS GUERBILSKY.